Aug. 25, 1964     L. E. TRENNER     3,146,155
CONSTRUCTION MATERIALS
Filed July 17, 1961

INVENTOR.
LEWIS E. TRENNER
BY
ATTORNEYS

United States Patent Office 3,146,155
Patented Aug. 25, 1964

3,146,155
CONSTRUCTION MATERIALS
Lewis Edmound Trenner, Englewood, Colo., assignor to Denver-Golden Research and Development Corporation, Denver, Colo., a corporation of Colorado
Filed July 17, 1961, Ser. No. 124,524
11 Claims. (Cl. 161—139)

This invention relates to construction and decorative materials, and more particularly to multi-purpose insulating, decorative and construction panels or sheets.

In recent years it has been common practice to use lightweight paneling materials for sidings, room dividers, outdoor louver assemblies, and as the skin for space frames, geodesic domes, and the like. However, the lightweight paneling materials now available, while satisfactory in many respects, have not possessed sufficient strength for many applications. To some extent this short-coming has been overcome by employing a corrugated configuration and laminating with other materials. One deficiency of such corrugated and laminated arrangements is that they do not pass direct light which is essential for many applications, such as glazing in greenhouses or the like, where direct light is essential for even distribution of natural ultra violet light. Conversely, thinner arrangements and non-corrugated materials have essentially no insulating properties and little strength.

Building material constructed according to my invention is fabricated entirely of Fiberglas type components. Preferably such material is formed as a flat panel comprising two smooth or surface textured Fiberglas sheets connected to and separated by novel reinforcing structure formed of Fiberglas. The reinforcing structure, in one embodiment, is a plurality of spaced coils or helices, each being composed of continuous glass rovings or parallel strands, saturated with polyester resin. The spaced sheets are usually of random oriented glass fibers saturated with a similar resin, and said sheets are permanently bonded to the coils or helices at each contact area. The resulting structure is strong, lightweight and, because of the composition and arrangement of components, is bendable without permanent deformation under usual loads, as the helices are capable of absorbing impact energy and distributing it through a given panel without permanent damage to said panel. A panel so fabricated has excellent thermal insulating properties and passes direct light and the natural ultra violet component thereof but diffuses it, thereby preventing spot burning when used in greenhouses or similar glazing environments.

Accordingly, it is an object of this invention to provide simple, durable and low cost construction materials possessing high strength and low weight.

Another object of the invention is to provide improved construction and decorative materials which may be used for a plurality of different purposes, and which are easily shaped, fitted and mounted in various installations.

A further object of the invention is to provide a lightweight, inexpensive and easily manufactured building material which has excellent thermal insulating properties, a high strength factor, ability to withstand impact, and passes direct light and the ultra violet component thereof.

Yet another object of the invention is to provide a lightweight, multi-purpose paneling material which is easily shaped and fabricated in a wide variety of shapes, thicknesses and surface contours or patterns; and which is particularly adapted for producing many new, artistic and distinctive effects.

A still further object of the invention is to provide a strong, yet lightweight building material which resists permanent deformation while absorbing and distributing impact energy.

Other objects and advantages of construction materials according to this invention will become apparent from the following description and reference to the drawings, and in said drawings like reference numerals are used to designate like parts in the several views.

Figure 1:
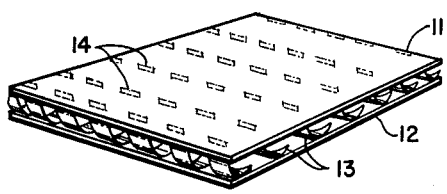
FIG. 1 is a perspective view of a panel of construction material according to my invention.
Figure 2:
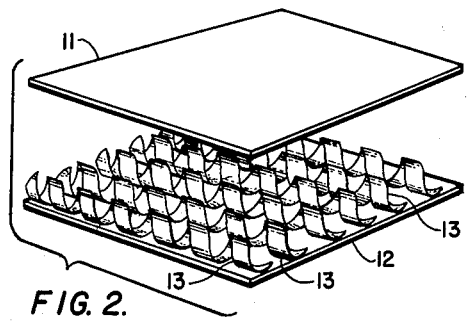
FIG. 2 is the panel of FIG. 1 shown with its top sheet raised to illustrate the internal arrangement of parts.
Figure 3:
FIG. 3 is a fragmentary portion of the reinforcing structure of the panel of FIG. 1.
Figure 6:
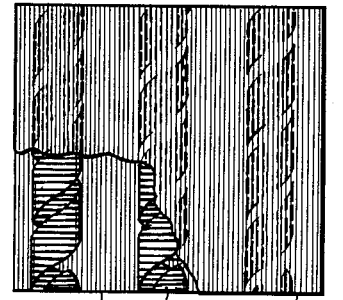
Figure 7:
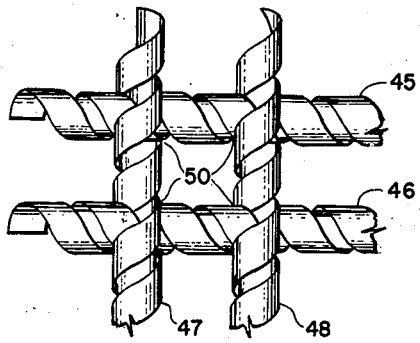

FIG. 6 is a fragmentary top plan view of a panel similar to the one shown in FIG. 1, with a corner of the top sheet partially broken away to show internal parts and lined for color to illustrate novel esthetic effects which may be incorporated into panels and constructed according to this invention; and FIG. 7 is a top plan view of an alternative arrangement of reinforcing structure of the type shown in FIG. 3.

Construction material according to this invention is fabricated of synthetic or natural resinous materials in combination with reinforcing fibers of glass or similar materials. In fabricating panels according to the invention, I prefer glass fibers and transparent resins such as acrylic modified polyester resins, which are transparent and do not obstruct light to any undesirable degree. In fact, structures fabricated of these resins transmit far more ultra violet light than a single thickness of sheet window glass. Furthermore, it is not necessary to whitewash the panels when they are to be used in a greenhouse, or the like, since they are natural diffusers which thereby prevent the undesirable spot burning which occurs with sheet glass unless whitewashed or treated in some similar manner.

The panels are comprised of two flat sheets 11 and 12 connected to and spaced apart by a plurality of substantially parallel reinforcing structural members 13 so as to form a sandwich-like integral assembly. The sheets 11 and 12 have glass fibers randomly oriented in a resin of the type above discussed. The glass fibers in the reinforcing structures are continuous parallel glass rovings or strands saturated with a resin similar to that used in the outer sheets 11 and 12. It is preferable that the strands be continuous and that they have no sharp bends, in order that impact energy, or the like, will not cause breakage thereof, but rather will be distributed through the reinforcing structure. My preferred configuration for reinforcing structure 13 is a continuous helix or coil, as shown in FIG. 3, which is discussed in detail below. Preferably the sheets and reinforcing members will possess different degrees of elasticity; and usually the sheets will be relatively stiff or rigid.

During the initial step of fabricating one of these panels, all the components including the outer sheets and the reinforcing structure are uncured but self-supporting and easily deformable. Further, when in this state, the components form a strong adhesive bond with adjoining surfaces. Thus, the components are easily arranged and connected to each other before curing without employing other materials as permanent fastenings or connectors. Since the panel materials are all transparent, unusual design patterns are obtained in the appearance of the structural assembly as represented by the areas 14 in FIG. 1. This makes interesting and artistic arrangements possible, as by adding small amounts of pigment or dye to the various parts without decreasing their transparency, distinctive hues and color contrasts may be obtained as illustrated in FIG. 6.

A convenient method of assembly is to form the helices on a heated mandrel to facilitate cure. After being cut to length, they are mounted on a jig comprising a series of parallel rods or wires and this assembly is placed upon a wet sheet of resin-saturated glass mat or fabric. When the mat cures, the jig is removed, and the partially formed panel is turned over with the coils facing down and placed on a similar sheet of the saturated mat composition. When this mat cures, an integral panel assembly 11, such as shown in FIG. 1, is formed, comprising a lightweight, structurally rigid and thermally insulated panel, which will pass and diffuse direct light and the ultra violet components thereof. This panel may be sawed, drilled and otherwise worked without impairing its structural properties.

Figure 4:
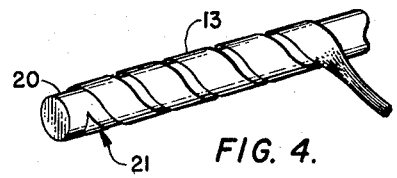
FIG. 4 illustrates an initial step in the method of fabricating the reinforcing structure of FIG. 3.

While the fabrication of sheets of Fiberglas material having random oriented glass fibers is well known in the art, the manner of fabricating reinforcing structure according to the invention involves different and novel practices in order that the continuous parallel rovings of glass fibers may be produced. I prefer to do this by forming the coils in a wrapping action around a heated mandrel, such as the round mandrel 20 in FIG. 4. An end portion of a continuous bundle of glass fibers saturated in a suitable resin is held fixed or otherwise attached at 21 adjacent an end portion of mandrel 20. Thereafter the bundle is wrapped around the mandrel forming the desired helical configuration.

While I have shown a mandrel 20 of circular cross-section, it is to be understood that various other shapes may be used. These may include hexagonal, octagonal, various eccentric shapings, and almost any other regular or non-regular polygonal shaping. However, any mandrel which is to be used for fabricating the helical reinforcing structural members should not produce sharp bends in the finished product. Although glass is an extremely strong material, it is very brittle and when loads or energy are applied against a glass sheet, such energy or loads tend to centralize at any bend or scratch on the glass material, thereby causing it to break. My manner of fabrication overcomes this inherent tendency of the glass fibers to a large degree when used to form the reinforcing structural members 13 shown and described herein.

Figure 5:
FIG. 5 is an alternative form of reinforcing structure.

Also, various other configurations for the reinforcing structural members may be employed, such as the substantially regular sine wave configuration of the reinforcing structural member 30 in FIG. 5. Reinforcing structural member 30 is fabricated of the same materials and in a manner quite similar to the fabrication of the helical reinforcing members 13. That is, it is composed of a bundle of parallel glass rovings or strands saturated with a suitable resin and cured to a self-sustaining and rigid state. However, even in this self-sustaining and rigid state, because of its curving configuration, it is capable of bending under impact loads and of distributing energy of the impact loads to the structural member without permanent deformation or other damage to said member. Other undulating or wave forms may be used, but sharp bends should not be formed in such reinforcing structure.

The panels of my invention are particularly adapted as a replacement for glass in many glazing applications. In many instances they may be used as a room divider or other type of non-weight bearing wall. To this end, various colored dyes or pigments are incorporated into the resinous binder material of the internal reinforcing members and other dyes or pigments may be incorporated in the resinous binder materials of which the external sheets are composed. FIG. 6 has been shaded for color in order to more clearly illustrate this novel and artistic arrangement. The upper and lower panels 40 and 41 have had a pink pigment or dye incorporated therein, whereas the helical reinforcing members 41 have had a blue pigment incorporated in the resinous binder material thereof. When the sandwich-like structure is assembled, using sheets 40 and reinforcing structural members 41, a deep purple effect is obtained at their points of contact with various degrees of tonal or shade graduation of purples, blues and pinks on adjacent parts, due to the transparent characteristics of the materials of which the panel is composed.

In the foregoing disclosure, flat panels have been shown and described as an example of the practice of my invention. It should be understood that because of the self-sustaining but easily deformable character of the starting materials from which the panels are fabricated that other configurations are possible. For instance, a curved molding surface will cause a sheet of uncured material to conform in shaping. Thereafter the similarly deformable reinforcing structural members, preferably coils, are laid on the bottom sheet and they too will conform over their lengthwise extent to the configuration of the curved mold. Similarly, a thereafter applied top sheet conforms to the same curve. The provision of the helices as reinforcing members is particularly advantageous where such shaping is required as the coils conform readily to the shaping; whereas honeycomb or egg crate forms or rigid foam cannot be used effectively for this purpose. The panel of my invention is a very desirable product for use as a cover for space frames, such as a geodesic dome. Previously, the cover or skin of such space frames has been made of very small segments, because larger curves could not be fabricated to maintain the desired structural property. However, much larger segments may be manufactured using the panel construction of my invention.

In some applications, such as space frames, greater structural strength is desirable than may be provided by the parallel internal reinforcing structural members 13, I have found that the arrangement of FIG. 7 is particularly adapted for providing increased structural strength to the sandwich paneling of my invention. As shown in FIG. 7, a pair of parallel reinforcing structural members 45 and 46, similar in all respects to the reinforcing structural member 13 above described, are intersected and interconnected with a pair of parallel reinforcing structural members 47 and 48 disposed in transverse or perpendicular relation. An adhesive connection or bond occurs at each intersection similar to the bond previously described at the contact areas between the coils of the reinforcing structural member 13 and sheets 11 and 12. Because of the characteristics of the continuous bundle of glass rovings, the intersections 50 are capable of some deformation under impact energy without permanent deformation or injury thereto.

When panels according to the invention are to be used as room dividers, and the artistic arrangement described with reference to FIG. 6 is desired, I have found that serpentine arrangements, spirals, adjoining or intertwining circles may be imparted to the reinforcing structural members so as to enhance the esthetic quality to the finished panel. Yet, even with these arrangements, great structural strength is found in the resulting panels.

Many novel combinations and arrangements of parts may be utilized in the practice of this invention. When the paneling is to be used as a heat insulating member more air space will be provided. The thickness of the fabricated panels can be varied with ease by increasing the numbers of strands or diameter of the original bundle of fibers used to construct the reinforcing structural members. The elasticity of the sheets and the reinforcing members may be varied to meet use requirements. In most instances, a transparent effect will be sought, but more opaque panels may be provided when it is necessary to lessen the passage of ultra violet.

In the various arrangements described herein, the combination of the flat outer sheets with their random pattern and arrangement of glass fibers and the configuration of the reinforcing structural members allows the panel to be bent under loads without permanent deformation, to absorb impact without permanent damage to the structure, and to be used in a wide variety of different environments for different purposes without variation of component parts.

Having thus described the invention with sufficient particularity to enable those skilled in the art to practice it, what I desire to have protected by Letters Patent is set forth in the following claims.

I claim:

1. As a new article of manufacture, a building panel comprising two relatively stiff sheets of light-permeable material composed of glass fibers substantially uniformly distributed through and suspended in a resinous binder, and a plurality of spaced helical reinforcing members shaped as tubes of substantially uniform diameter sandwiched between said sheets with their lengthwise axes substantially parallel to the sheets and bonded thereto at points of contact to form an integral panel, and each said reinforcing member being more elastic than said sheets and composed of continuous rovings of fiber suspended in a resinous binder.

2. The building panel of claim 1, in which the reinforcing members are disposed in parallel in two sets with the members of one set intersecting the members of the other set at substantially right angles.

3. As a new article of manufacture, a building panel comprising two essentially rigid but bendable sheets of light-permeable material composed of glass fibers subsantially uniformly distributed through and suspended in a resinous binder, and a plurality of spaced helical reinforcing members shaped as tubes of substantially uniform diameter sandwiched between said sheets with their lengthwise axes substantially parallel to the sheets and bonded thereto at points of contact to form an integral panel, and each said reinforcing member being more elastic than said sheets and composed of continuous rovings of fiber suspended in a resinous binder.

4. As a new article of manufacture, a building panel comprising two essentially rigid but bendable sheets of light-permeable material composed of random oriented glass fibers suspended in a resinous binder, and a plurality of spaced helical reinforcing members shaped as tubes of substantially uniform diameter sandwiched between said sheets with their lengthwise axes substantially parallel to the sheets and bonded thereto at points of contact to form an integral panel, and each said reinforcing member being more elastic than said sheets and composed of a bundle of parallel continuous strands of fiber suspended in a resinous binder.

5. As a new article of manufacture, a building panel comprising two relatively stiff sheets of material composed of glass fibers substantially uniformly distributed through and suspended in a transparent resinous binder, and a plurality of spaced helical reinforcing members shaped as tubes of substantially uniform diameter sandwiched between said sheets with their lengthwise axes substantially parallel to the sheets and bonded thereto at points of contact to form an integral panel, and each said reinforcing member being more elastic than said sheets and composed of continuous rovings of fiber suspended in a transparent resinous binder in color contrast with said sheets.

6. As a new article of manufacture, a building panel adapted to pass and diffuse direct light, including ultra violet components thereof, comprising two essentially rigid but bendable sheets of material composed of random oriented glass fibers suspended in a transparent resinous binder, and a plurality of helical reinforcing members shaped as tubes of substantially uniform diameter sandwiched between said sheets at substantially spaced intervals with their lengthwise axes substantially parallel and parallel to the sheets and bonded thereto at points of contact to form an integral panel capable of absorbing impact energy without permanent deformation, and each said reinforcing member being more elastic than said sheets and composed of a bundle of continuous parallel strands of fiber suspended in a transparent resinous binder material.

7. The building material of claim 1 in which the reinforcing structural members are continuous helices and the continuous rovings therein are a bundle of parallel strands of fiber which extend from one end to the other of a helix.

8. The building material of claim 1 in which the spaced sheets and the reinforcing structural members are fabricated with a transparent resinous binder material.

9. The building material of claim 1 in which the reinforcing structural members are parallel to each other and positioned at spaced intervals extending substantially from one peripheral edge to another peripheral edge of said sheets.

10. A panel according to claim 6 in which the reinforcing structural members are continuous and substantially regular helices, in which the bundle of parallel strands of fiber extend from one end to the other of the helices.

11. A panel according to claim 6 in which the spaced sheets and the reinforcing structural members are composed of a transparent resinous binder material, including a coloring dye providing the respective transparent structural members with complementary colors.

References Cited in the file of this patent

UNITED STATES PATENTS

| 2,095,369 | Quinn | Oct. 12, 1937 |
| 2,399,744 | Kaphan | May 7, 1946 |
| 2,477,852 | Bacon | Aug. 2, 1949 |
| 2,561,781 | Bruce | July 24, 1951 |
| 2,954,076 | Crane | Sept. 27, 1960 |
| 2,978,529 | Brisley | Apr. 4, 1961 |

FOREIGN PATENTS

| 14,079 | Germany | May 30, 1881 |
| 1,085,331 | France | July 22, 1954 |